(12) United States Patent
Chen

(10) Patent No.: US 10,643,550 B2
(45) Date of Patent: May 5, 2020

(54) LIQUID CRYSTAL DISPLAY DEVICE

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/087,141

(22) PCT Filed: Dec. 16, 2017

(86) PCT No.: PCT/CN2017/116719
§ 371 (c)(1),
(2) Date: Sep. 21, 2018

(87) PCT Pub. No.: WO2018/121306
PCT Pub. Date: Jul. 5, 2018

(65) Prior Publication Data
US 2019/0114975 A1  Apr. 18, 2019

(30) Foreign Application Priority Data

Dec. 27, 2016 (CN) .......................... 2016 1 1229076

(51) Int. Cl.
*G09G 3/34* (2006.01)
*G02F 1/133* (2006.01)
(Continued)

(52) U.S. Cl.
CPC .......... *G09G 3/3413* (2013.01); *G02F 1/1368* (2013.01); *G02F 1/13306* (2013.01);
(Continued)

(58) Field of Classification Search
CPC .......... G09G 3/3413; G09G 2320/0247; G09G 2320/0646; G09G 2360/16; G09G 3/3426;
(Continued)

(56) References Cited

U.S. PATENT DOCUMENTS

2008/0074372 A1* 3/2008 Baba .................... G09G 3/3406
345/89
2010/0103089 A1* 4/2010 Yoshida ............... G09G 3/2022
345/102

(Continued)

*Primary Examiner* — Koosha Sharifi-Tafreshi
(74) *Attorney, Agent, or Firm* — WPAT, PC

(57) ABSTRACT

The disclosure relates to a liquid crystal display device, including a display panel having a display component and a backlight module having a backlight component divided into a plurality of backlight sub-areas, wherein the liquid crystal display device further includes a drive component, connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; a backlight control component, connected to the drive component; and a backlight adjusting component, connected to the backlight control component and the backlight component respectively.

20 Claims, 10 Drawing Sheets

(51) Int. Cl.
*G09G 3/20* (2006.01)
*G02F 1/13357* (2006.01)
*G02F 1/1368* (2006.01)
*G09G 3/36* (2006.01)
*G02F 1/1345* (2006.01)

(52) U.S. Cl.
CPC ...... *G02F 1/13452* (2013.01); *G02F 1/13454* (2013.01); *G02F 1/133602* (2013.01); *G02F 1/133611* (2013.01); *G09G 3/2003* (2013.01); *G09G 3/3426* (2013.01); *G09G 3/3607* (2013.01); *G09G 3/3648* (2013.01); *G09G 3/3666* (2013.01); *G02F 1/133621* (2013.01); *G02F 2001/133601* (2013.01); *G09G 2300/0426* (2013.01); *G09G 2300/0452* (2013.01); *G09G 2310/08* (2013.01); *G09G 2320/028* (2013.01); *G09G 2320/0233* (2013.01); *G09G 2320/0247* (2013.01); *G09G 2320/0285* (2013.01); *G09G 2320/066* (2013.01); *G09G 2320/0626* (2013.01); *G09G 2320/0646* (2013.01); *G09G 2360/16* (2013.01)

(58) Field of Classification Search
CPC ........ G09G 3/342; G09G 3/36; G09G 3/2003; G09G 3/3607; G09G 3/3648; G09G 3/3666; G09G 2300/0426; G09G 2300/0452; G09G 2310/08; G09G 2320/0233; G09G 2320/0285; G09G 2320/028; G09G 2320/0626; G09G 2320/066; G02F 1/133621; G02F 2001/133601; G02F 1/13306; G02F 1/133602; G02F 1/13452; G02F 1/13454; G02F 1/133611; G02F 1/1368
See application file for complete search history.

(56) References Cited

U.S. PATENT DOCUMENTS

2014/0354708 A1* 12/2014 Ikeda .................. G09G 3/3426
345/690
2018/0047345 A1* 2/2018 Dunn ................ G02F 1/133606

* cited by examiner

First frame + Second frame

| R | G | B | R | G | B | R | G | B | R | G | B |
|---|---|---|---|---|---|---|---|---|---|---|---|
| 0 | 1 | 0 | 1 | 0 | 1 | 0 | 1 | 0 | 1 | 0 | 1 |
| 0 | 1 | 0 | 1 | 0 | 1 | 0 | 1 | 0 | 1 | 0 | 1 |

| 0 | 1 | 2 | …… | 154 | 255 |
|---|---|---|---|---|---|
| R(0) | R(1) | R(2) | …… | R(254) | R(255) |

| 0 | 1 | 2 | …… | 154 | 255 |
|---|---|---|---|---|---|
| G(0) | G(1) | G(2) | …… | G(254) | G(255) |

| 0 | 1 | 2 | …… | 154 | 255 |
|---|---|---|---|---|---|
| B(0) | B(1) | B(2) | …… | B(254) | B(255) |

FIG. 13

LIQUID CRYSTAL DISPLAY DEVICE

FIELD OF THE DISCLOSURE

The disclosure relates to the field of liquid crystal display technologies, and more particularly to a liquid crystal display device.

BACKGROUND

Typical large-size liquid crystal display devices most adopt a negative type VA liquid crystal or IPS liquid crystal technology. The VA type liquid crystal driving is fast saturated with a drive voltage under a large viewing angle, which leads to relatively severe viewing angle color cast and further affects a picture quality.

SUMMARY

On such basis, it is necessary to provide a liquid crystal display device, which can improve the defect of viewing angle color cast and effectively eliminates bright and dark stripes or a lattice phenomenon of the liquid crystal display panel.

A liquid crystal display device includes a display panel having a display component and a backlight module having a backlight component divided into a plurality of backlight sub-areas, wherein the liquid crystal display device further includes a drive component, connected to the display component and configured to display each picture with two frame images in sequence; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; the drive component further includes a data acquiring module, configured to acquire position information of a current sub-pixel and drive data for driving the current sub-pixel; a judging parameter lookup module, configured to look up a judging parameter corresponding to the position information in a first parameter lookup table according to the position information; an output module, configured to directly output the drive data if the judging parameter is a first parameter; a compensation parameter lookup module, configured to look up and outputting compensation drive data in a second parameter lookup table according to the position information and the drive data if the judging parameter is a second parameter, wherein the second parameter lookup table corresponds to the position information, and the compensation drive data corresponds to the drive data; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a backlight adjusting component, connected to the backlight control component and the backlight component respectively, and configured to perform independent brightness adjustment on a backlight source of the sub-pixels of various colors in corresponding backlight sub-areas in respective frame images of a next picture.

In one of the embodiments, the liquid crystal display device further includes a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

In one of the embodiments, the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas.

In one of the embodiments, a calculating formula for the calculating unit to solve the backlight brightness adjustment signal of the sub-pixels of each color in each backlight sub-area is as follows: $A_{M\_P1}*P_{M\_ave1}=A_{M\_P2}*P_{M\_ave2}$; $2*A_{M\_P}*P_{M\_ave}=A_{M\_P1}*P_{M\_ave1}+A_{M\_P2}*P_{M\_ave2}$; wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub-area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

In one of the embodiments, the backlight source is a white light backlight source, an RGB backlight source, an RGBW backlight source or RGBY backlight source.

In one of the embodiments, the liquid crystal display device further includes a display panel, and the display component and the drive component are integrated on the display panel.

In one of the embodiments, the liquid crystal display device further includes a backlight module, and the backlight component, the backlight control component and the backlight adjusting component are integrated on the backlight module.

In one of the embodiments, the drive component further includes a timing controller.

In one of the embodiments, the liquid crystal display device further includes a backlight module, and the backlight component, the backlight control component and the backlight adjusting component are integrated on the backlight module; the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas.

In one of the embodiments, the second parameter lookup table of the drive component includes a first compensation parameter lookup table, a second compensation parameter lookup table and a third compensation parameter lookup table; the compensation parameter lookup module includes a first color sub-pixel compensation parameter lookup unit, configured to look up and outputting the compensation drive data in the first compensation parameter lookup table if the sub-pixels corresponding to the position information are first color sub-pixels; a second color sub-pixel compensation parameter lookup unit, configured to look up and outputting the compensation drive data in the second compensation parameter lookup table if the sub-pixels corresponding to the position information are second color sub-pixels; and a third color sub-pixel compensation parameter lookup unit, configured to look up and outputting the compensation drive data in the third compensation parameter lookup table if the sub-pixels corresponding to the position information are third color sub-pixels.

In one of the embodiments, the display panel includes at least one sub-pixel unit, the sub-pixel unit includes m column×n row sub-pixels, the at least one sub-pixel unit is regularly arranged to form a pixel array including m column×n row sub-pixels, the first parameter lookup table is formed by m column×n row judging parameters, and the sub-pixels in the sub-pixel unit correspond to the judging parameters in the first parameter lookup table one to one according to an arrangement position; wherein M≥m≥1, N≥n≥1, and M, N, m and n are positive integers.

In one of the embodiments, the each column of sub-pixels in the pixel array includes multiple groups of sub-pixels, each group of sub-pixels includes a first color sub-pixel, a second color sub-pixel and a third color sub-pixels which are arranged in sequence, the sub-pixels in a same row are same in color, and the first color sub-pixel, the second color sub-pixel and the third color sub-pixel have at least one red sub-pixel, at least one green sub-pixel and at least one blue sub-pixel.

The disclosure further provides another liquid crystal display device, including a display panel having a display component and a backlight module having a backlight component divided into a plurality of backlight sub-areas, wherein the liquid crystal display device further includes a display panel and a drive component, connected to the display component and configured to display each picture with two frame images in sequence; the display component and the drive component ate integrated on the display panel; the two frame images include a first frame image and a second frame image; drive voltages of adjacent two sub-pixels on each frame image include a high drive voltage and a low drive voltage, and the drive voltages of each sub-pixel in the first frame image and in the second frame image include a high drive voltage and a low drive voltage; the drive component further includes a data acquiring module, configured to acquire position information of a current sub-pixel and drive data for driving the current sub-pixel; a judging parameter lookup module, configured to look up a judging parameter corresponding to the position information in a first parameter lookup table according to the position information; an output module, configured to directly output the drive data if the judging parameter is a first parameter; a compensation parameter lookup module, configured to look up and outputting compensation drive data in a second parameter lookup table according to the position information and the drive data if the judging parameter is a second parameter, wherein the second parameter lookup table corresponds to the position information, and the compensation drive data corresponds to the drive data; a backlight control component, connected to the drive component and configured to determine backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; a backlight adjusting component, connected to the backlight control component and the backlight component respectively, and configured to perform independent brightness adjustment on a backlight source of the sub-pixels of various colors in corresponding backlight sub-areas in respective frame images of a next picture; wherein the backlight component, the backlight control component and the backlight adjusting component are integrated on the backlight module.

In one of the embodiments, the liquid crystal display device further includes a storage component, wherein the storage component is configured to store a lookup table; the lookup table is a corresponding relation table of the drive voltage of each sub-pixel in the first frame image and the second frame image corresponding to an input signal and the input signal; and the drive component acquires the drive voltage of each sub-pixel on the first frame image and the second frame image by the lookup table.

In one of the embodiments, the backlight control component includes a counting unit, configured to count average drive voltages of the sub-pixels of various colors in the first frame image area and the second frame image area corresponding to each backlight sub-area; and a calculating unit, configured to solve the backlight brightness adjustment signals according to the average drive voltages, reference backlight brightness signals and reference drive voltages of respective backlight sub-areas.

In one of the embodiments, a calculating formula for the calculating unit to solve the backlight brightness adjustment signal of the sub-pixels of each color in each backlight sub-area is as follows: $A_{M\_P1}*P_{M\_ave1}=A_{M\_P2}*P_{M\_ave2}$; $2*A_{M\_P}*P_{M\_ave}=A_{M\_P1}*P_{M\_ave1}+A_{M\_P2}*P_{M\_ave2}$; wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub-area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

In one of the embodiments, the backlight source is a white light backlight source, an RGB backlight source, an RGBW backlight source or RGBY backlight source.

In one of the embodiments, the drive component further includes a timing controller.

In one of the embodiments, the second parameter lookup table of the drive component includes a first compensation parameter lookup table, a second compensation parameter lookup table and a third compensation parameter lookup table; the compensation parameter lookup module includes a first color sub-pixel compensation parameter lookup unit, configured to look up and outputting the compensation drive data in the first compensation parameter lookup table if the sub-pixels corresponding to the position information are first color sub-pixels; a second color sub-pixel compensation parameter lookup unit, configured to look up and outputting the compensation drive data in the second compensation parameter lookup table if the sub-pixels corresponding to the position information are second color sub-pixels; and a third color sub-pixel compensation parameter lookup unit, configured to look up and outputting the compensation drive data in the third compensation parameter lookup table if the sub-pixels corresponding to the position information are third color sub-pixels.

In one of the embodiments, the display panel includes at least one sub-pixel unit, the sub-pixel unit includes m column×n row sub-pixels, the at least one sub-pixel unit is regularly arranged to form a pixel array including m column×n row sub-pixels, the first parameter lookup table is formed by m column×n row judging parameters, and the sub-pixels in the sub-pixel unit correspond to the judging parameters in the first parameter lookup table one to one according to an arrangement position; wherein M≥m≥1, N≥n≥1, and M, N, m and n are positive integers.

In one of the embodiments, the each column of sub-pixels in the pixel array includes multiple groups of sub-pixels, each group of sub-pixels includes a first color sub-pixel, a second color sub-pixel and a third color sub-pixels which are arranged in sequence, the sub-pixels in a same row are same in color, and the first color sub-pixel, the second color sub-pixel and the third color sub-pixel have at least one red sub-pixel, at least one green sub-pixel and at least one blue sub-pixel.

According to the liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

In addition, according to embodiments of the disclosure, by acquiring the position information of the current sub-pixel and the drive data for driving the current sub-pixel, and looking up the judging parameter corresponding to the position information in the first parameter lookup table, whether the drive data needs to be compensated is determined according to the judging parameter, if compensation is needed, then in the second parameter lookup table corresponding to the position information, the compensation drive data corresponding to the drive data is looked up and output, otherwise the drive data is directly output, thereby effectively eliminating bright and dark stripes or a lattice phenomenon of the liquid crystal display panel.

BRIEF DESCRIPTION OF THE DRAWINGS

FIG. 13 is a schematic diagram of a compensation parameter lookup table provided by another embodiment of the disclosure.

DETAILED DESCRIPTION OF PREFERRED EMBODIMENTS

In order to make the objects, technical solutions and advantages of the disclosure clearer, the disclosure is further described in detail in combination with drawings and embodiments. It should be understood that the specific embodiments described here are merely intended for explaining rather than limiting the disclosure.

Figure 1:
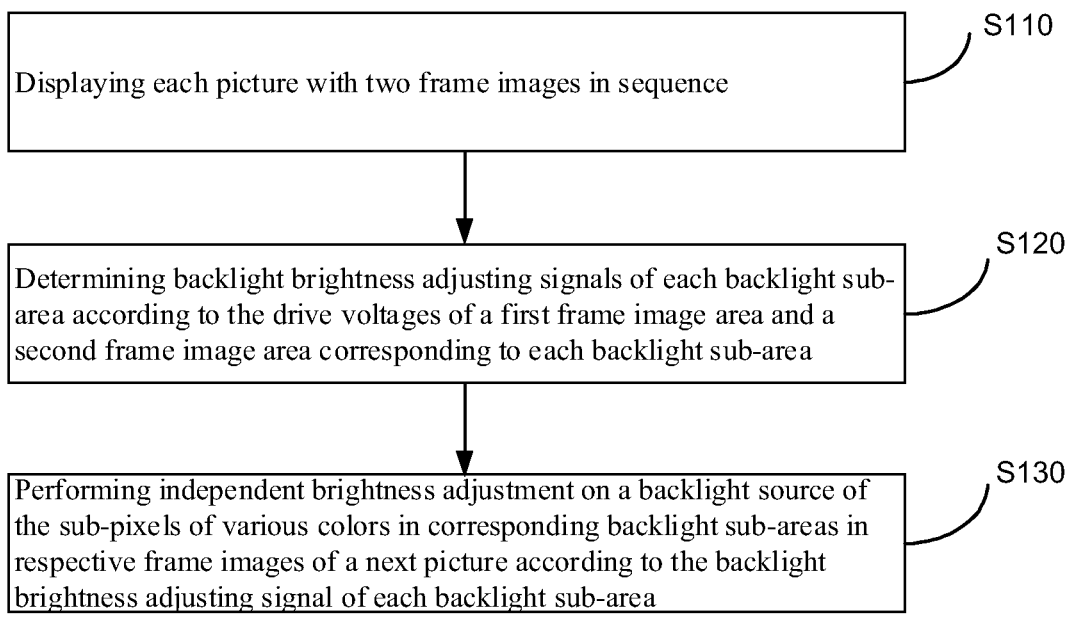
FIG. 1 is a flowchart of a driving method for a liquid crystal display device in one embodiment.
Figure 2:
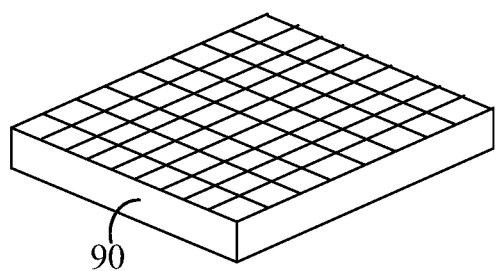
FIG. 2 is a schematic view of sub-areas of a backlight area of the liquid crystal display device in FIG. 1.

FIG. 1 is a flowchart of a driving method for a liquid crystal display device in one embodiment. The liquid crystal display device may be a TN, OCB, VA type or curve surface liquid crystal display device, but not limited thereto. The liquid crystal display device can apply straight down backlight, and a backlight source may be white light, an RGB three-color light source, an RGBW four-color light source or an RGBY four-color light source, but not limited thereto. The driving method is also suitable for a scenario that a display panel of the liquid crystal display device is a curve panel. In the present embodiment, a backlight area of the liquid crystal display device is divided into a plurality of backlight sub-areas, as shown in FIG. 2. In FIG. 2, 90 represents a backlight component (or backlight module).

Referring to FIG. 1, the method includes the following steps.

S110 displaying each picture with two frame images in sequence.

Figure 3:
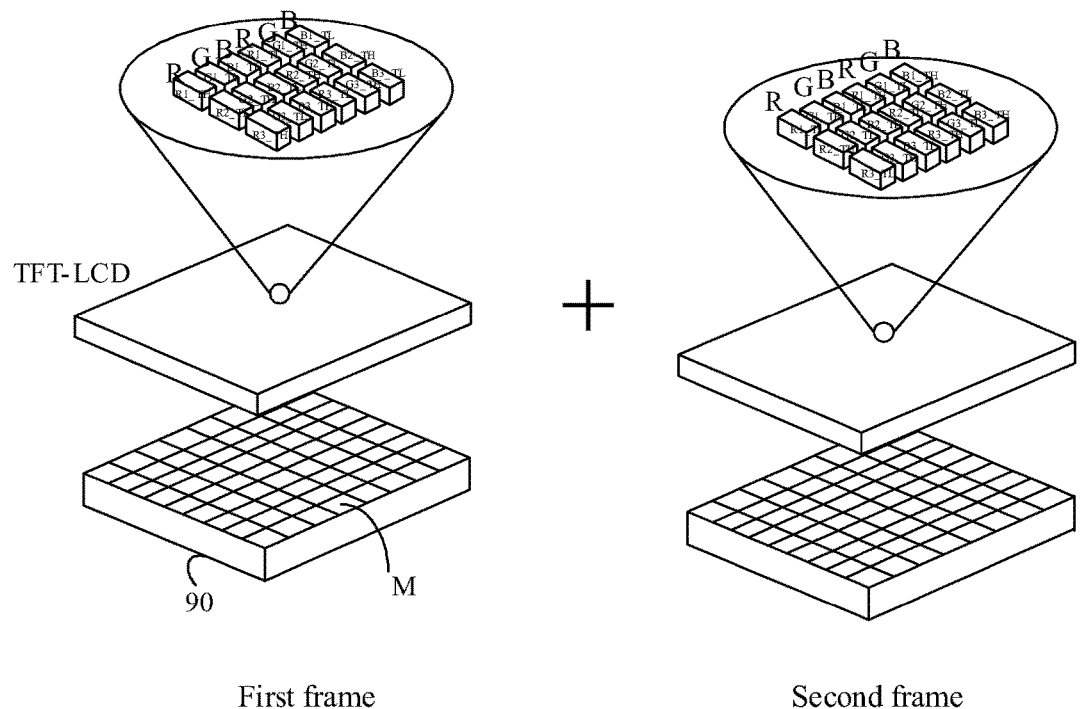
FIG. 3 is a schematic view of driving a display area of the liquid crystal display device in FIG. 1.
Figure 4:
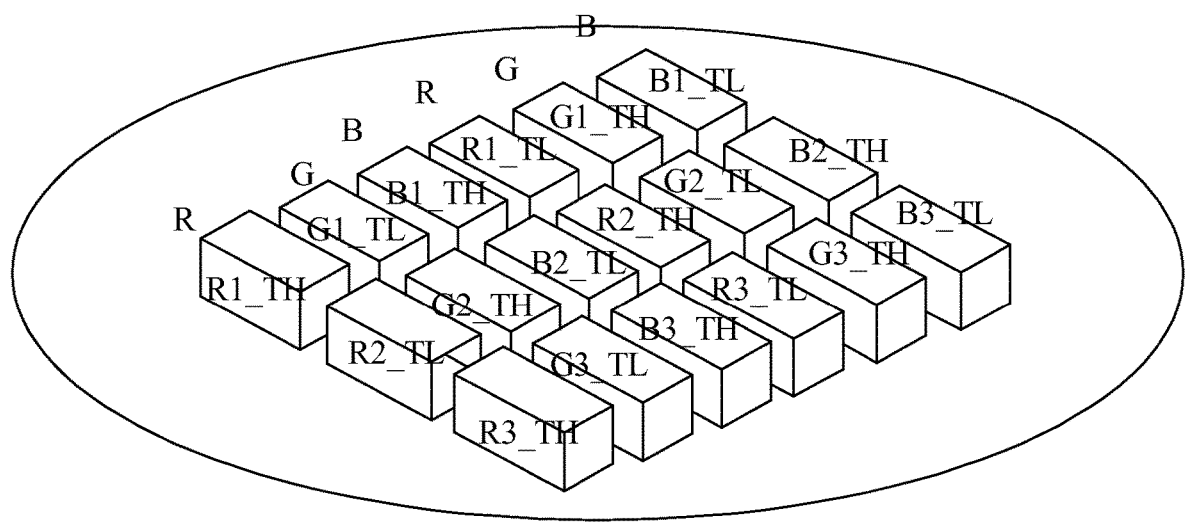
FIGS. 4 and 5 are partial enlarged views in FIG. 3.
Figure 5:
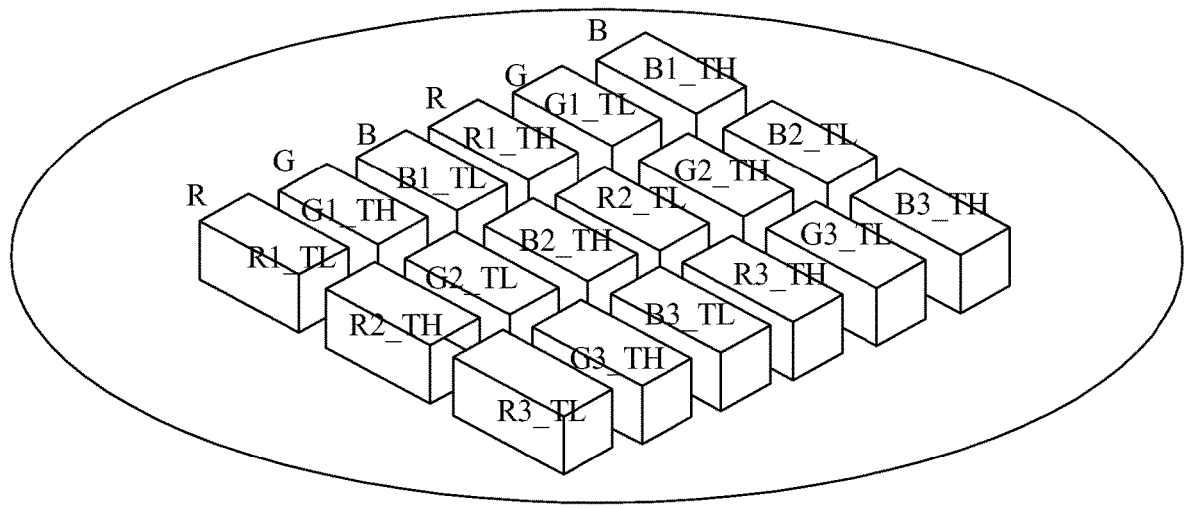

Each picture frame_N (i.e., a typical frame picture) is displayed with two frame images in sequence, that is, the picture is divided into two images on timing sequence. By dividing the picture on the timing sequence, a frame frequency can be doubled, that is, the original 60 Hz is doubled to 120 Hz. The two frame images are a first frame image (frame_N-1) and a second frame image (frame_N-2) respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for each sub-pixel in the first frame image and the second frame image may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. Seen from a 8 bit drive signal, input color gray scale values 0-255 of every R/G/B input signal correspond to 256 pairs of high and low voltage signals, and there are 3*256 pairs of high voltage signals $R_{TH}/G_{TH}/B_{TH}$ and low voltage signals $R_{TL}/G_{TL}/B_{TL}$ in total. Therefore, the corresponding high drive voltage and the corresponding low drive voltage can be looked up according to the color gray scale value of each sub-pixel in the input signal, such that the corresponding sub-pixel in the first frame image is driven by the high drive voltage, and the corresponding sub-pixel in the second frame image is driven by the low drive voltage, or the corresponding sub-pixel in the first frame image is driven by the low drive voltage, and the corresponding sub-pixel in the second frame image is driven by the high drive voltage, and meanwhile, the adjacent two sub-pixels are driven by a driving manner of alternate high and low drive voltages, as shown in FIG. 3. Wherein FIG. 4 is a partial enlarged view in a first frame in FIG. 3, and FIG. 5 is a partial enlarged view in a second frame in FIG. 3.

S120 determining backlight brightness adjusting signals of each backlight sub-area according to the drive voltages of a first frame image area and a second frame image area corresponding to each backlight sub-area.

The backlight brightness adjusting signals are configured to perform backlight brightness adjustment on two frame images in a next picture, to reduce a viewing angle color cast of the picture. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signals is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

Figure 6:
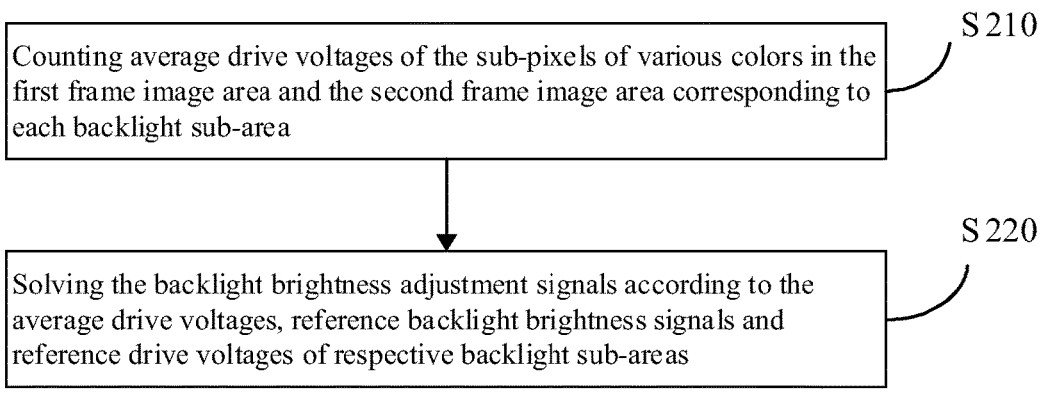
FIG. 6 is a specific flowchart of step S120 in FIG. 1.

In the present embodiment, a flow of determining the backlight brightness adjusting signals is as shown in FIG. 6, and includes S210 and S220.

S210 counting average drive voltages of the sub-pixels of various colors in the first frame image area and the second frame image area corresponding to each backlight sub-area.

A calculating formula for the average drive voltage of the sub-pixels of each color in the corresponding first frame image area in each backlight sub-area is as follows:

$$P_{M\_ave1}=Ave(P_{M\_n\_TL},P_{M\_n+1\_TH},P_{M\_n+2\_TL},\ldots),$$
$$n=1,2,3\ldots.$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1}=Ave(R_{M\_n\_TL},R_{M\_n+1\_TH},R_{M\_n+2\_TL},\ldots),$$
$$n=1,2,3\ldots;$$

$$G_{M\_ave1}=Ave(G_{M\_n\_TH},G_{M\_n+1\_TL},G_{M\_n+2\_TH},\ldots,$$
$$n=1,2,3\ldots;$$

$$B_{M\_ave1}=Ave(B_{M\_n\_TL},B_{M\_n+1\_TH},B_{M\_n+2\_TL},\ldots,$$
$$n=1,2,3\ldots.$$

S220 solving the backlight brightness adjustment signals according to the average drive voltages, reference backlight brightness signals and reference drive voltages of respective backlight sub-areas.

The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source corresponding to the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $A_{M\_P}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1}=Ave(P_n+P_{n+1}+P_{n+2}+\ldots)$, $n=1, 2, 3 \ldots$.

In the present embodiment, one pixel of each frame image includes an R sub-pixel, a G sub-pixel and a B sub-pixel. Therefore, correspondingly, it is required to solve the backlight brightness adjusting signals of the backlight source of the sub-pixels of various colors in each backlight sub-area, specifically:

A solving formula for the backlight brightness adjusting signals $A_{M\_R1}$ and $A_{M\_R2}$ of the R sub-pixels in the backlight sub-area M is $$A_{M\_R1}*R_{M\_ave1}=A_{M\_R2}*R_{M\_ave2};$$

$$2*A_{M\_R}*R_{M\_ave}=A_{M\_R1}*R_{M\_ave1}+A_{M\_R2}*R_{M\_ave2}.$$

A solving formula for the backlight brightness adjusting signals $A_{M\_G1}$ and $A_{M\_G2}$ of the G sub-pixels in the backlight sub-area M is $$A_{M\_G1}*G_{M\_ave1}=A_{M\_G2}*G_{M\_ave2};$$

$$2*A_{M\_G}*G_{M\_ave}=A_{M\_G1}*G_{M\_ave1}+A_{M\_G2}*G_{M\_ave2}.$$

A solving formula for the backlight brightness adjusting signals $A_{M\_B1}$ and $A_{M\_B2}$ of the B sub-pixels in the backlight sub-area M is $$A_{M\_B1}*B_{M\_ave1}=A_{M\_B2}*B_{M\_ave2};$$

$$2*A_{M\_B}*B_{M\_ave}=A_{M\_B1}*B_{M\_ave1}+A_{M\_B2}*B_{M\_ave2}.$$

S130 performing independent brightness adjustment on a backlight source of the sub-pixels of various colors in corresponding backlight sub-areas in respective frame images of a next picture according to the backlight brightness adjusting signal of each backlight sub-area.

In the adjusting process, the backlight sources of the R sub-pixels, the G sub-pixels and the B sub-pixels in the corresponding backlight sub-area M of the first frame image in the next picture are independently adjusted according to $A_{M\_R1}$, $A_{M\_G1}$ and $A_{M\_B1}$, and the backlight sources of the R sub-pixels, the G sub-pixels and the B sub-pixels in the corresponding backlight sub-area M of the second frame image in the next picture are independently adjusted according to $A_{M\_R2}$, $A_{M\_G2}$ and $A_{M\_B2}$, such that the compensated picture brightness is same as the picture brightness not compensated by the high and low voltages (i.e., typical driving). By independent backlight source control, the flickering discomfort phenomenon visible to naked eyes caused by a switching difference of the high and low voltages during driving can be reduced, and the defect of color cast caused by mismatch of a large viewing angle refractive index of the liquid crystal display device is effectively improved.

According to the driving method for a liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

Figure 7:
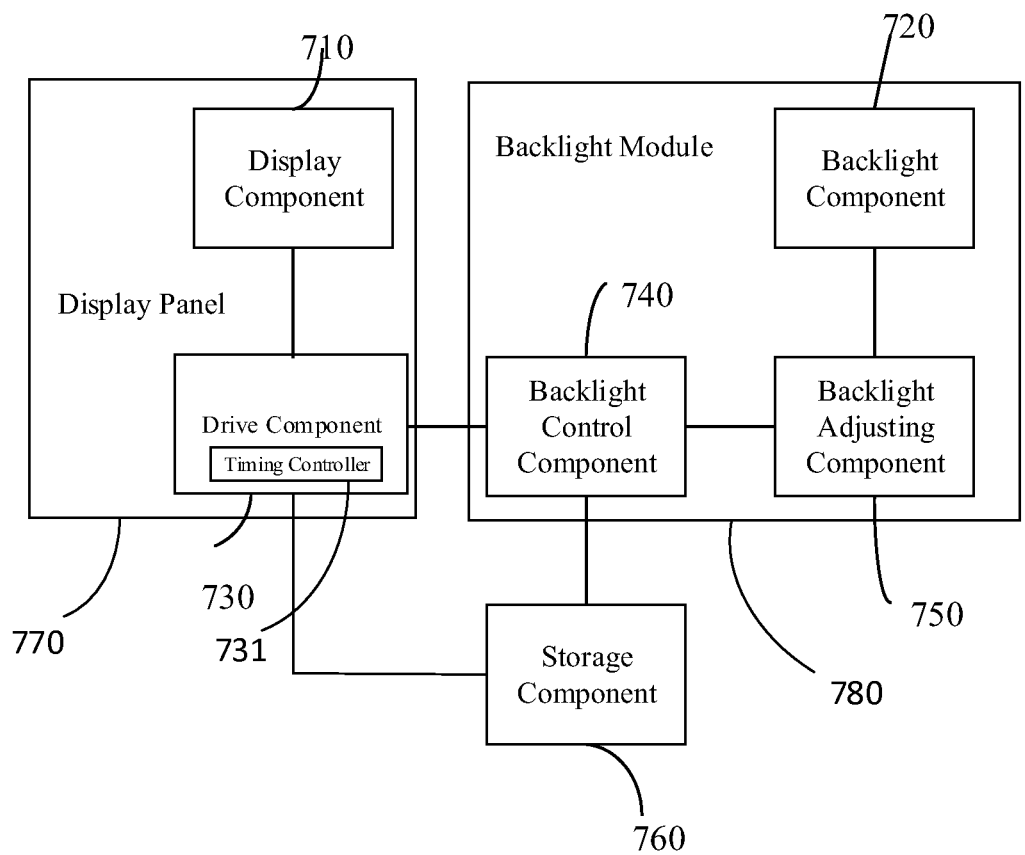
FIG. 7 is a structural block diagram of a liquid crystal display device in one embodiment.

The disclosure further provides a liquid crystal display device, as shown in FIG. 7. The liquid crystal display device may execute the above driving method. The liquid crystal display device includes a display component 710 and a backlight component 720 and further includes a drive component 730, a backlight control component 740 and a backlight adjusting component 750. Wherein the display component 710 and the drive component 730 can be integrated on a display panel 770, and the backlight component 720, the backlight control component 740 and the backlight adjusting component 750 can be integrated on the backlight module 780. It is understandable that an integration manner of respective components is not limited thereto.

The display component 710 may adopt a TN, OCB or VA type TFT display panel, but not limited thereto. The display component 710 can be a display component having a curve surface panel.

The backlight component 720 is configured to provide backlight. The backlight component 720 may apply straight down backlight, and a backlight source may be white light, an RGB three-color light source, an RGBW four-color light source or an RGBY four-color light source, but not limited thereto. The backlight area of the backlight component 720 is divided into a plurality of backlight subareas, as shown in FIG. 2.

The drive component 730 is connected to the display component 710. The drive component 730 is configured to display each picture with two frame images. The two frame images are a first frame image and a second frame image respectively. The picture corresponding to an input signal is displayed for a user by mutual compensation of the first frame image and the second frame image. In the present embodiment, drive voltages of adjacent two sub-pixels on each frame image include a high drive voltage and a low drive voltage, and the drive voltages of each sub-pixel in the first frame image and in the second frame image include a high drive voltage and a low drive voltage. That is, the drive voltage of each sub-pixel of the first frame image is inverted to be the drive voltage for each sub-pixel of the second frame image. The drive voltages for the drive component 730 to drive each sub-pixel may be acquired by looking up a lookup table (LUT). Specifically, the liquid crystal display device will prestore the lookup table in a hardware frame buffer. The lookup table is a corresponding relation table of the drive voltage of each sub-pixel in the first frame image and the second frame image corresponding to an input signal and the input signal. The drive component 730 includes a timing control circuit 731 (timing controller). In one embodiment, the liquid crystal display device further includes a storage device 760, for storing the lookup table.

The backlight control component 740 is connected to the drive component 730 and configured to determine backlight brightness adjusting signals of each backlight sub-area according to the drive voltages of a first frame image area and a second frame image area corresponding to each backlight sub-area. The backlight brightness adjusting signals are in groups ($A_{M\_P1}$ and $A_{M\_P2}$), to adjust the backlight brightness of the backlight sub-areas corresponding to the first frame image and the second frame image respectively. Besides, a group number of the backlight brightness adjusting signal is same as a variety number of color sub-pixels, to perform independent backlight brightness control on the sub-pixels of various colors. For example, in the present embodiment, the color sub-pixels include red sub-pixels (R sub-pixels), green sub-pixels (G sub-pixels) and blue sub-pixels (B sub-pixels). Therefore, each group of backlight brightness adjusting signals includes an R sub-pixel backlight brightness adjusting signal group, a G sub-pixel backlight brightness adjusting signal group and a B sub-pixel backlight brightness adjusting signal group, to perform independent backlight brightness control on the sub-pixels of various colors in respective backlight sub-areas.

Figure 8:
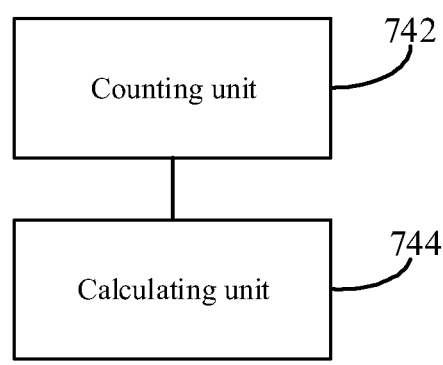
FIG. 8 is a structural block diagram of a backlight control component in one embodiment.

The backlight control component 740 includes a counting unit 742 and a calculating unit 744, as shown in FIG. 8. Wherein a formula for the counting unit 742 to calculate the average drive voltage of the sub-pixels of each color in the corresponding first frame image area in each backlight sub-area is as follows:

$$P_{M\_ave1}=\text{Ave}(P_{M\_n\_TL}, P_{M\_n+1\_TH}, P_{M\_n+2\_TL}, \ldots),$$
$$n=1,2,3\ldots.$$

Wherein P represents a target color sub-pixel, M represents a serial number of the backlight sub-area, ave1 represents an average drive voltage value of the first image, and n represents a sequence number of the P sub-pixel in the M backlight sub-area.

Specifically, the average drive voltages for the sub-pixels of various colors are calculated as follows:

$$R_{M\_ave1}=\text{Ave}(R_{M\_n\_TL}, R_{M\_n+1\_TH}, R_{M\_n+2\_TL}, \ldots),$$
$$n=1,2,3\ldots;$$

$$G_{M\_ave1}=\text{Ave}(G_{M\_n\_TH}, G_{M\_n+1\_TL}, G_{M\_n+2\_TH}, \ldots,$$
$$n=1,2,3\ldots;$$

$$B_{M\_ave1}=\text{Ave}(B_{M\_n\_TL}, B_{M\_n+1\_TH}, B_{M\_n+2\_TL}, \ldots,$$
$$n=1,2,3\ldots.$$

The calculating unit 744 is configured to solve the backlight brightness adjustment signals according to the average drive voltages, reference backlight brightness signals and reference drive voltages of respective backlight sub-areas. The reference backlight brightness signal refers to the backlight brightness signal when no compensation of high and low voltages (i.e., a typical driving manner) is required. The reference drive voltage refers to the drive voltage of various sub-pixels when no compensation of high and low voltages is performed. Since the backlight source of the sub-pixels of various colors in each sub-area is independently controlled, the backlight brightness adjusting signals of the backlight source corresponding to the sub-pixels of various colors in each sub-area need to be solved. A calculating formula for the backlight brightness adjustment signal of the sub-pixels of each color in each backlight sub-area M is as follows:

$$A_{M\_P1}*P_{M\_ave1}=A_{M\_P2}*P_{M\_ave2};$$

$$2*A_{M\_P}*P_{M\_ave}=A_{M\_P1}*P_{M\_ave1}+A_{M\_P2}*P_{M\_ave2}.$$

Wherein P represents a target color sub-pixel; M represents a serial number of the backlight sub-area. $A_{M\_P1}$ represents the backlight brightness adjustment signal for performing backlight brightness adjustment on a backlight source of P sub-pixels in the backlight sub-area M corresponding to the first frame image of the next picture. $A_{M\_P2}$ represents the backlight brightness adjustment signal for performing backlight brightness adjustment on a backlight source of the P sub-pixels in the backlight sub-area M corresponding to the second frame image of the next picture. $P_{M\_ave1}$ represents an average value of the drive voltages of the P sub-pixels in the backlight sub-area M corresponding to the first frame image of the current picture. In the present embodiment, since the drive voltage of the sub-pixel is matched with the input signal (i.e., a gray scale value of the corresponding color), the average value of the drive voltages can serve as an evaluation parameter for viewing angle brightness of the color sub-pixels. $P_{M\_ave2}$ represents an average value of the drive voltages of the P sub-pixels in the backlight sub-area M corresponding to the second frame image of the current picture. $A_{M\_P}$ represents the reference backlight brightness signal of the P sub-pixels in the backlight sub-area M corresponding to the image of the current picture. $P_{M\_ave}$ represents the average value of reference drive voltages of the P sub-pixels in the frame image area corresponding to the backlight sub-area M on the image of the current picture. Specifically, $P_{M\_ave1}=\text{Ave}(P_n+P_{n+1}+P_{n+2}+\ldots)$, n=1, 2, 3 ....

The backlight adjusting component 750 is connected to the backlight control component 740 and the backlight component 720 respectively. The backlight adjusting component 750 is configured to perform independent brightness adjustment on a backlight source of the sub-pixels of various colors in corresponding backlight sub-areas in respective frame images of a next picture according to the backlight brightness adjusting signal in each backlight sub-area, such that the compensated picture brightness is same as the picture brightness not compensated by the high and low voltages.

According to the above liquid crystal display device, each picture is displayed by two frame images in sequence, each frame image is driven by adopting high and low alternate voltage signals, the high and low drive voltages of the first frame image and the second frame image are inverted, and the backlight brightness adjusting signals of one picture are generated according to respective drive voltages to perform independent backlight adjustment on the backlight source of the sub-pixels of various colors in the corresponding backlight sub-areas in the respective frame images of the next picture. According to the above liquid crystal display device, brightness compensation for each backlight sub-area M is supplemented, such that not only is the whole panel brightness maintained to be not different from an uncompensated typical drive brightness, but also a Low color shift viewing angle compensation effect can also be realized, the flickering discomfort phenomenon visible to naked eyes caused by a switching difference of the high and low voltages during the original driving is avoided, and the defect of color cast caused by mismatch of a large viewing angle refractive index of the liquid crystal display device is effectively improved. The above liquid crystal display device can realize cooperative driving in time domain and space domain. Besides, the pixels on the display component do not need to be divided into main and second pixels again, thereby greatly reducing a technological complexity of the display panel, greatly improving a transmittance and a resolution of the liquid crystal display panel, and reducing a backlight design cost.

Figure 9:
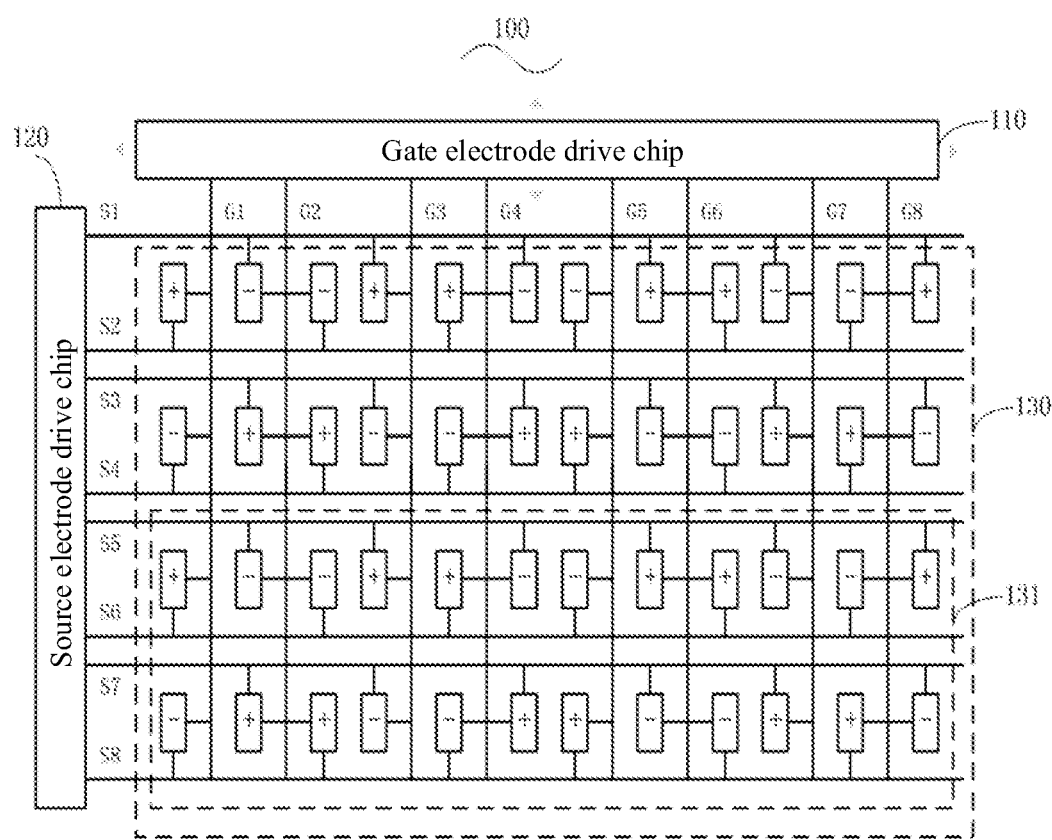
FIG. 9 is a schematic view of a display panel based on a dual-gate electrode drive structure provided by another embodiment of the disclosure.

FIG. 9 shows a liquid crystal display device based on a dual-gate electrode drive structure provided by another embodiment of the disclosure. The liquid crystal display device includes a display panel 770, and a drive component is integrated in the display panel 770. Wherein the display panel 770 includes at least one sub-pixel unit 131, the sub-pixel unit 131 includes m column×n row sub-pixels, the at least one sub-pixel unit 131 is regularly arranged to form a pixel array 130 including m column×n row sub-pixels, the M columns of sub-pixels in the pixel array 130 are driven by a source electrode drive chip 120, the N rows of sub-pixels in the pixel array 130 are driven by a gate electrode drive chip 110, wherein M≥m≥1, N≥n≥1, and M, N, m and n are positive integers.

In specific application, each column of sub-pixels in the pixel array includes multiple groups of sub-pixels, each group of sub-pixels includes a first color sub-pixel, a second color sub-pixel and a third color sub-pixels which are arranged in sequence, the sub-pixels in a same row are same in color, and the first color sub-pixel, the second color sub-pixel and the third color sub-pixel have at least one red sub-pixel, at least one green sub-pixel and at least one blue sub-pixel.

In one embodiment of the disclosure, the display panel adopts a combination manner of the dual-gate electrode drive structure and 2 line inversion. Therefore, in each group of sub-pixels, undoubtedly, a polarity of adjacent two sub-pixels is a first polarity, the polarity of another sub-pixel is a second polarity, and one of the first polarity and the second polarity is a positive polarity while the other is a negative polarity. In a same column of sub-pixels, the polarities of every other two sub-pixels are inverted once, and in a same row of sub-pixels, the adjacent sub-pixels are different in polarity.

In specific application, based on the combination of the dual-gate electrode drive structure and the 2 line inversion, a column number of the sub-pixels that each sub-pixel unit includes equals to 2, and a color arrangement rule and a polarity arrangement rule for each sub-pixel unit in the pixel array are same.

FIG. 9 exemplarily shows the pixel array 130 when M=4, N=12, m=2 and n=12, that is, shows a 4 column (shown as S1-S4 in the figure)×12 row (shown as G1-G12) pixel array, the first color sub-pixels are red sub-pixels, the second color sub-pixels are green sub-pixels and the third color sub-pixels are blue sub-pixels. In FIG. 9, "+" represents positive polarity, "−" represents negative polarity, R represents the red sub-pixels, G represents the green sub-pixels and B represents the blue sub-pixels.

Figure 10:
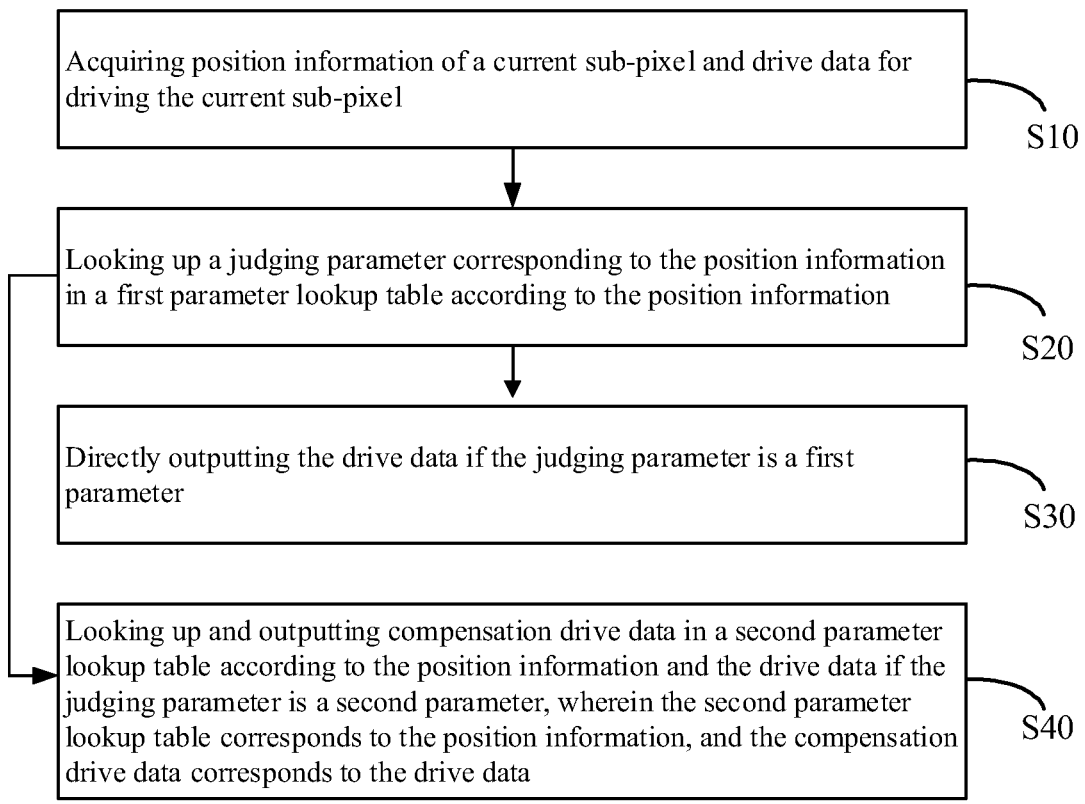
FIG. 10 is a flow block diagram of a driving method for a display panel provided by another embodiment of the disclosure of the disclosure.

FIG. 10 shows a driving method for the display panel provided by an embodiment of the disclosure, which includes Step S10 acquiring position information of a current sub-pixel and drive data for driving the current sub-pixel.

In specific application, the position information of the current sub-pixel specifically refers to a column number and a row number of the current sub-pixel in the pixel array of the display panel, since the color of each sub-pixel in the pixel array of the display panel is known, the color of the sub-pixel can be known according to the position information of the sub-pixel. The drive data of the sub-pixel specifically refers to data for controlling a drive voltage of the sub-pixel, the drive data of the sub-pixel is configured to realize brightness control over the sub-pixel, and a value of the drive data is in positive correlation with the drive voltage and the brightness.

Step S20 looking up a judging parameter corresponding to the position information in a first parameter lookup table according to the position information.

In specific application, the judging parameter is used for judging whether the drive data of the current sub-pixel needs to be compensated or not, if the drive data is used to drive the sub-pixel, darkness of the sub-pixel is caused, then it is indicated that the drive data needs to be compensated, otherwise, the drive data needs no compensation.

In the present embodiment, the judging parameter specifically includes a first parameter for representing that the drive data does not need to be compensated and a second parameter for representing that the drive data needs to be compensated.

In specific application, the first parameter may be a value 1 specifically, the second parameter may be a value 0 specifically, and in other embodiments, the first parameter and the second parameter may also be equivalently replaced with other numbers or functions having a same meaning.

In specific application, since a display characteristic of the sub-pixel in each position in the pixel array is known in advance, the display characteristic of the sub-pixel can be known according to a position of the sub-pixel, and further whether the sub-pixel needs to be compensated can be known. In one embodiment, the judging parameter can be looked up by the position information of the sub-pixel, and the first parameter lookup table is the lookup table constructed according to the position information of the sub-pixel and the judging parameter.

In one embodiment, the sub-pixels in the sub-pixel unit correspond to the judging parameters in the first parameter lookup table one to one according to an arrangement position, that is, the sub-pixels in the same positions correspond to the judging parameters.

In one embodiment, the first parameter lookup table may be a display (look-up-table) LUT, and the look-up-table has a function of inputting data, i.e., looking up the corresponding output data according to the input data, and the first parameter lookup table may also be other data tables or random access memory (RAM)-like storage mediums with a same function.

In one embodiment, the method, before the step S20, further includes setting and storing the first parameter lookup table in advance.

Figures 11, 12:
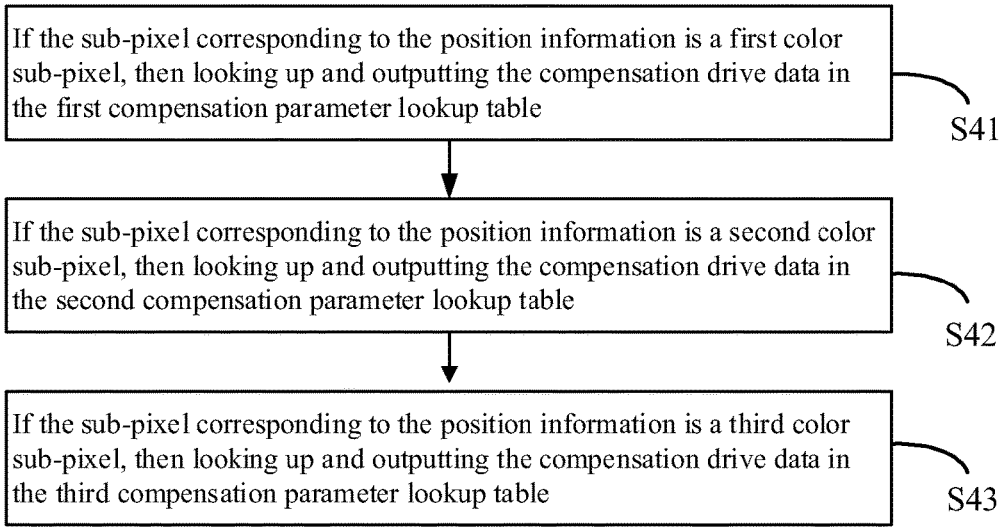
FIG. 11 is a schematic view of a judging lookup table provided by another embodiment of the disclosure.
FIG. 12 is a flow block diagram of step S40 provided by another embodiment of the disclosure.

As shown in FIG. 11, one embodiment of the disclosure exemplarily shows a first parameter lookup table including 2 column×12 row judging parameters, and in the table, R represents red sub-pixels, G represents green sub-pixels, B represents blue sub-pixels, 0 represents the first parameter and 1 represents the second parameter.

Step S30 directly outputting the drive data if the judging parameter is a first parameter.

In specific application, the first parameter is used for representing that the drive data does not need to be compensated. Therefore, when the judging parameter is the first parameter, the drive data can be directly output to drive the sub-pixel, and no darkness phenomenon of the sub-pixel is caused.

S40 looking up and outputting compensation drive data in a second parameter lookup table according to the position information and the drive data if the judging parameter is a second parameter, wherein the second parameter lookup table corresponds to the position information, and the compensation drive data corresponds to the drive data.

In specific application, the second parameter is used for representing that the drive data needs to be compensated. Therefore, when the judging parameter is the second parameter, the drive data cannot drive the sub-pixel till being compensated, to avoid the darkness phenomenon of the sub-pixel.

In one embodiment, the second parameter lookup table may be a look-up-table (LUT), and may also be other data tables or random access memory (RAM)-like storage mediums with a same function.

In specific application, the sub-pixel is driven by outputting the compensation drive data, and the darkness phenomenon of the sub-pixel can be solved. Since the present embodiment mainly solves the case of darkness of the sub-pixel during polarity inversion, a value of the drive data looked by the second parameter lookup table is larger than the original value.

In one embodiment, the method, before the second S40, further includes setting and storing the second parameter lookup table in advance.

According to the embodiment of the disclosure, by acquiring the position information of the current sub-pixel and the drive data for driving the current sub-pixel, and looking up the judging parameter corresponding to the position information in the first parameter lookup table, whether the drive data needs to be compensated is determined according to the judging parameter, if compensation is needed, then in the second parameter lookup table corresponding to the position information, the compensation drive data corresponding to the drive data is looked up and output, and if compensation is not needed, the drive data is directly output, thereby effectively eliminating bright and dark stripes or a lattice phenomenon of the liquid crystal display panel.

In one embodiment, the second parameter lookup table of the drive component includes a first compensation parameter lookup table, a second compensation parameter lookup table and a third compensation parameter lookup table, and different compensation parameter lookup tables are used specific to the sub-pixels of different colors.

As shown in FIG. 12, in one embodiment of the disclosure, the step S40 specifically includes the following steps.

Step S41 if the sub-pixel corresponding to the position information is a first color sub-pixel, then looking up and outputting the compensation drive data in the first compensation parameter lookup table.

In one embodiment, the method, before the step S41, includes setting and storing the first compensation parameter lookup table in advance.

In one embodiment, the step S41 specifically includes when Mod(N,3)=1, the compensation drive data corresponding to the drive data is looked up and output in the first compensation parameter lookup table, wherein N is a row number of the sub-pixels that the display panel includes.

Step S42 if the sub-pixel corresponding to the position information is a second color sub-pixel, then looking up and outputting the compensation drive data in the second compensation parameter lookup table.

In one embodiment, the method, before the step S42, includes setting and storing the second compensation parameter lookup table in advance.

In one embodiment, the step S42 specifically includes when Mod(N,3)=2, the compensation drive data corresponding to the drive data is looked up and output in the second compensation parameter lookup table, wherein N is a row number of the sub-pixels that the display panel includes.

Step S43 if the sub-pixel corresponding to the position information is a third color sub-pixel, then looking up and outputting the compensation drive data in the third compensation parameter lookup table.

In one embodiment, the method, before the step S43, includes setting and storing the third compensation parameter lookup table in advance.

In one embodiment, the step S43 specifically includes when Mod(N,3)=0, the compensation drive data corresponding to the drive data is looked up and output in the third compensation parameter lookup table, wherein N is a row number of the sub-pixels that the display panel includes.

In the present embodiment, the Mod (number, divisor) function represents a Mod function, wherein number represents dividend and divisor represents divider.

In one embodiment, the first compensation parameter lookup table, the second compensation parameter lookup table and the third compensation parameter lookup table may all be a look-up-table (LUT), and may also be other data tables or random access memory (RAM)-like storage mediums with a same function.

In one embodiment, the first color sub-pixel is a red sub-pixel, the second color sub-pixel is a green sub-pixel and the third color sub-pixel is a blue sub-pixel. The first compensation parameter lookup table is a red sub-pixel compensation parameter lookup table, the second compensation parameter lookup table is a green sub-pixel compensation parameter lookup table and the third compensation parameter lookup table is a blue sub-pixel compensation parameter lookup table.

As shown in FIG. 13, one embodiment of the disclosure exemplarily shows the red sub-pixel compensation parameter lookup table R, the green sub-pixel compensation parameter lookup table G and the blue sub-pixel compensation parameter lookup table B. Wherein numbers 0, 1, 2 . . . 254 and 255 on the left of the red sub-pixel compensation parameter lookup table R represent sizes of the drive data, R(0), R(1) R,(2) . . . R(254) and R(255) on the right represent sizes of the compensation drive data, and a parameter representing rule of the green sub-pixel compensation parameter lookup table and the blue sub-pixel compensation parameter lookup table is same as that of the red sub-pixel compensation parameter lookup table.

Figure 14:
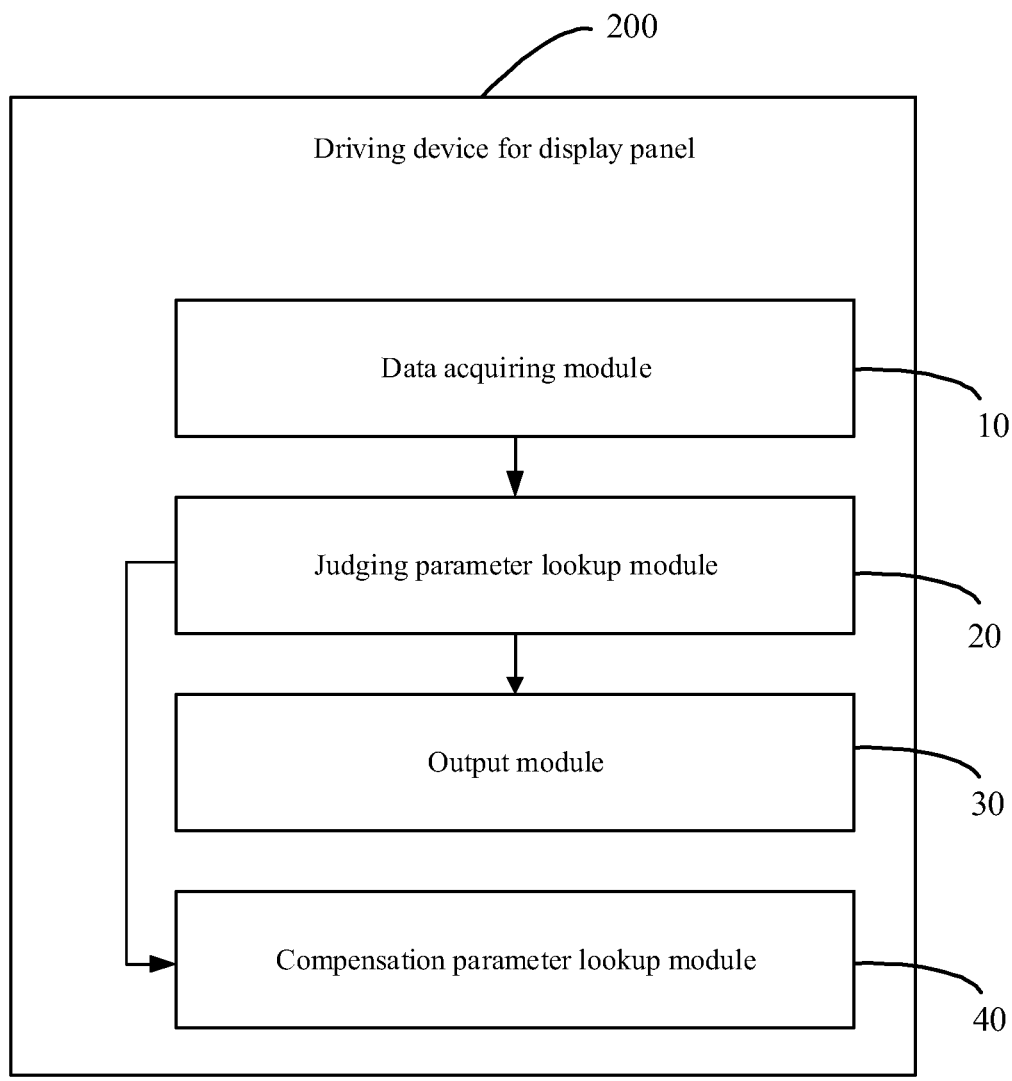
FIG. 14 is a structural block diagram of a driving device for a display panel provided by another embodiment of the disclosure.

As shown in FIG. 14, one embodiment of the disclosure provides a drive component 200 for a display panel, configured to execute the driving method as shown in FIG. 10, and including a data acquiring module 10, configured to acquire position information of a current sub-pixel and drive data for driving the current sub-pixel; a judging parameter lookup module 20, configured to look up a judging parameter corresponding to the position information in a first parameter lookup table according to the position information; an output module 30, configured to directly output the drive data if the judging parameter is a first parameter; and a compensation parameter lookup module 40 configured to look up and outputting compensation drive data in a second parameter lookup table according to the position information and the drive data if the judging parameter is a second parameter, wherein the second parameter lookup table corresponds to the position information, and the compensation drive data corresponds to the drive data.

In actual application, the drive component 200 may be a software system in a source electrode drive chip in the embodiment corresponding to FIG. 9.

In one embodiment, the drive component further 200 further includes a storage module configured to prestore the first parameter lookup table and the second parameter lookup table.

According to the embodiment of the disclosure, by acquiring the position information of the current sub-pixel and the drive data for driving the current sub-pixel, and looking up the judging parameter corresponding to the position information in the first parameter lookup table, whether the drive data needs to be compensated is determined according to the judging parameter, if compensation is needed, then in the second parameter lookup table corresponding to the position information, the compensation drive data corresponding to the drive data is looked up and output, and if compensation is not needed, the drive data is directly output, thereby effectively eliminating bright and dark stripes or a lattice phenomenon of the liquid crystal display panel.

Figure 15:
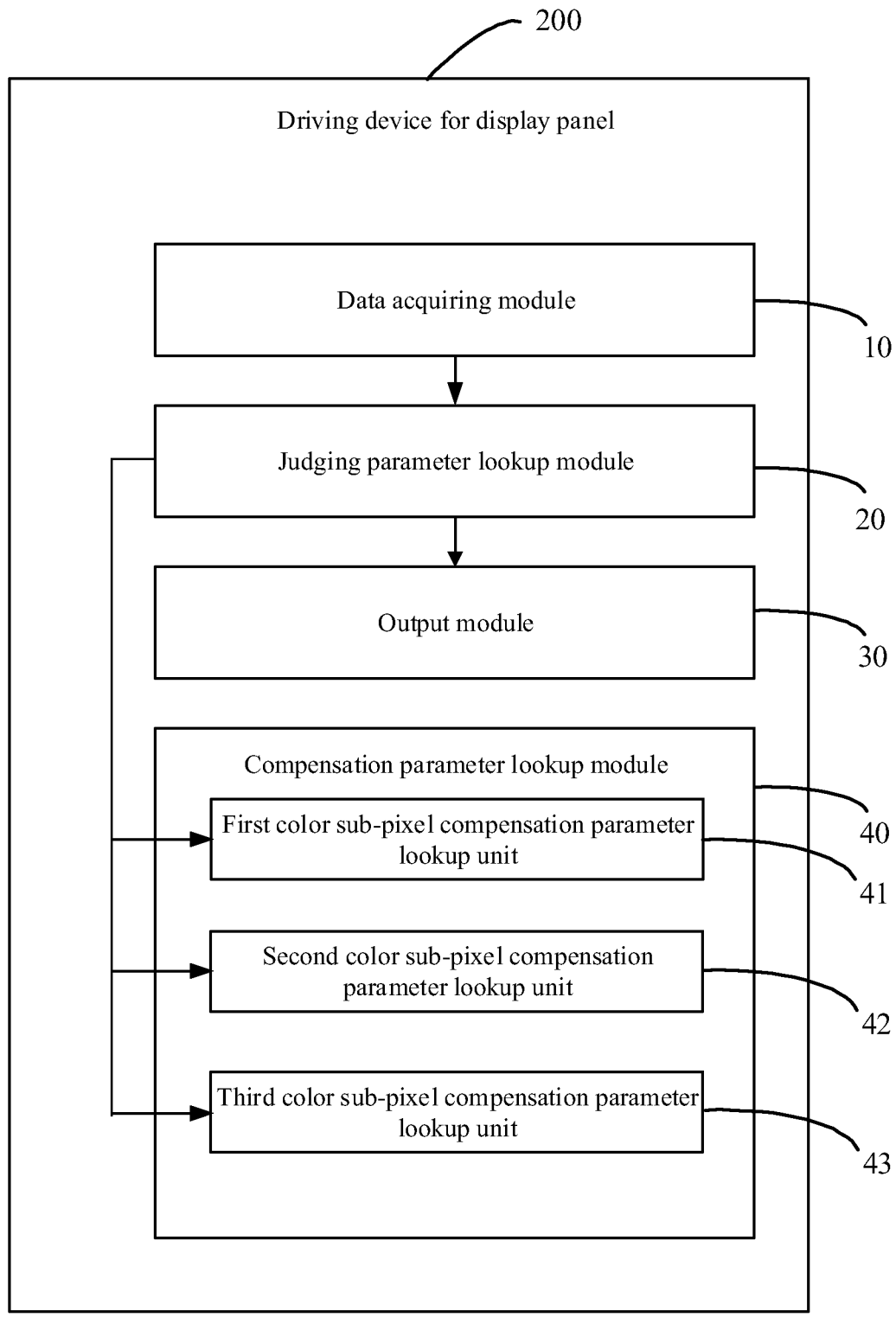
FIG. 15 is a structural block diagram of a driving device for a display panel provided by another embodiment of the disclosure.

As shown in FIG. 15, in one embodiment of the disclosure, the compensation parameter lookup module 40 is a structure configured to execute the method embodiment as shown in FIG. 12, and specifically includes a first color sub-pixel compensation parameter lookup unit 41, configured to, if the sub-pixel corresponding to the position information is a first color sub-pixel, look up and outputting the compensation drive data in the first compensation parameter lookup table; a second color sub-pixel compensation parameter lookup unit 42, configured to, if the sub-pixel corresponding to the position information is a second color sub-pixel, look up and outputting the compensation drive data in the second compensation parameter lookup table; and a third color sub-pixel compensation parameter lookup unit 43, configured to, if the sub-pixel corresponding to the position information is a third color sub-pixel, look up and outputting the compensation drive data in the third compensation parameter lookup table.

In one embodiment, the compensation parameter lookup module 40 further includes a first storage unit, configured to set and store the first compensation parameter lookup table in advance.

In one embodiment, the first color sub-pixel compensation parameter lookup unit 41 is specifically configured to, when Mod(N,3)=1, look up and output the compensation drive data corresponding to the drive data in the first compensation parameter lookup table, wherein N is a row number of the sub-pixels that the display panel includes.

In one embodiment, the compensation parameter lookup module 40 further includes a second storage unit, configured to set and store the second compensation parameter lookup table in advance.

In one embodiment, the second color sub-pixel compensation parameter lookup unit 42 is specifically configured to, when Mod(N,3)=2, looking up and outputting the compensation drive data corresponding to the drive data in the second compensation parameter lookup table, wherein N is a row number of the sub-pixels that the display panel includes.

In one embodiment, the compensation parameter lookup module 40 further includes a third storage unit, configured to set and store the third compensation parameter lookup table in advance.

In one embodiment, the third color sub-pixel compensation parameter lookup unit 43 is specifically configured to, when Mod(N,3)=0, look up and output the compensation drive data corresponding to the drive data in the third compensation parameter lookup table, wherein N is a row number of the sub-pixels that the display panel includes.

The respective technical features of the above embodiments can be freely combined, in order for concise description, not all possible combinations of the respective technical features of the above embodiments are described, however, as long as the combinations of these respective technical features do not conflict against each other, they are considered to be in a range recorded by the disclosure.

The foregoing merely expresses several embodiments of the disclosure, which are described in a relatively specific and detailed manner, but should be understood as a limitation to the scope of the disclosure. It should be pointed out that those ordinary skilled in the art could make a plurality of transformations and improvements without departing from a concept of the disclosure, and they all fall within the protective scope of the disclosure. Therefore, a protective scope of the disclosure should take appended claims as a criterion.

What is claimed is:

1. A liquid crystal display device, comprising a display panel having a display component and a backlight module having a backlight component divided into a plurality of backlight sub-areas, wherein the liquid crystal display device further comprises a memory storing a computer executable instruction, and a driving device, wherein the driving device executes the computer executable instruction that performs a method comprising:

displaying each picture with two frame images in sequence; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;

acquiring position information of a current sub-pixel and drive data for driving the current sub-pixel;

looking up a judging parameter corresponding to the position information in a first parameter lookup table according to the position information;

directly outputting the drive data if the judging parameter is a first parameter; and looking up and outputting compensation drive data in a second parameter lookup table according to the position information and the drive data if the judging parameter is a second parameter, wherein the second parameter lookup table corresponds to the position information, and the compensation drive data corresponds to the drive data;

wherein the backlight module further comprises:

a first backlight controller connected to the driving device and configured for determining backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels; and a second backlight controller connected to the first backlight controller and the backlight component respectively, and configured for performing independent brightness adjustment on a backlight source of the sub-pixels of various colors in corresponding backlight sub-areas in respective frame images of a next picture.

2. The liquid crystal display device according to claim 1, further comprising a storage memory, wherein the storage memory is electrically connected to the display panel and the backlight module and is configured for storing a lookup table; the lookup table is a corresponding relation table of the drive voltage of each sub-pixel in the first frame image and the second frame image corresponding to an input signal and the input signal; and the driving device acquires the drive voltage of each sub-pixel on the first frame image and the second frame image by the lookup table.

3. The liquid crystal display device according to claim 1, wherein the first backlight controller component comprises
a counter, configured for counting average drive voltages of the sub-pixels of various colors in the first frame image area and the second frame image area corresponding to each backlight sub-area; and
a calculator, configured for solving the backlight brightness adjustment signals according to the average drive voltages, reference backlight brightness signals and reference drive voltages of respective backlight sub-areas.

4. The liquid crystal display device according to claim 3, wherein a calculating formula for the calculator to solve the backlight brightness adjustment signal of the sub-pixels of each color in each backlight sub-area is as follows:

$$A_{M\_P1}*P_{M\_ave1}'A_{M\_P2}*P_{M\_ave2};$$

$$2*A_{M\_P}*P_{M\_ave}=A_{M\_P1}*P_{M\_ave1}+A_{M\_P2}*P_{M\_ave2};$$

wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub-area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

5. The liquid crystal display device according to claim 1, wherein the backlight source is a white light backlight source, an RGB backlight source, an RGBW backlight source or RGBY backlight source.

6. The liquid crystal display device according to claim 1, further comprising a display panel, wherein the display component and the driving device are integrated on the display panel.

7. The liquid crystal display device according to claim 1, further comprising a backlight module, wherein the backlight component, the first backlight controller and the second backlight controller are integrated on the backlight module.

8. The liquid crystal display device according to claim 1, wherein the driving device further comprises a timing controller.

9. The liquid crystal display device according to claim 1, further comprising a backlight module, wherein the backlight component, the first backlight controller and the second backlight controller are integrated on the backlight module;
the first backlight controller comprises
a counter, configured for counting average drive voltages of the sub-pixels of various colors in the first frame image area and the second frame image area corresponding to each backlight sub-area; and
a calculator, configured solving sore the backlight brightness adjustment signals according to the average drive voltages, reference backlight brightness signals and reference drive voltages of respective backlight sub-areas.

10. The liquid crystal display device according to claim 1, wherein the second parameter lookup table of the driving device comprises a first compensation parameter lookup table, a second compensation parameter lookup table and a third compensation parameter lookup table;
the step of looking up and outputting compensation drive data in a second parameter lookup table according to the position information and the drive data if the judging parameter is a second parameter comprises:
looking up and outputting the compensation drive data in the first compensation parameter lookup table if the sub-pixels corresponding to the position information are first color sub-pixels;
looking up and outputting the compensation drive data in the second compensation parameter lookup table if the sub-pixels corresponding to the position information are second color sub-pixels; and
looking up and outputting the compensation drive data in the third compensation parameter lookup table if the sub-pixels corresponding to the position information are third color sub-pixels.

11. The liquid crystal display device according to claim 6, wherein the display panel comprises at least one sub-pixel unit, the sub-pixel unit comprises m column×n row sub-pixels, the at least one sub-pixel unit is regularly arranged to form a pixel array comprising m column×n row sub-pixels, the first parameter lookup table is formed by m column×n row judging parameters, and the sub-pixels in the sub-pixel unit correspond to the judging parameters in the first parameter lookup table one to one according to an arrangement position;
wherein M≥m≥1, N≥n≥1, and M, N, m and n are positive integers.

12. The liquid crystal display device according to claim 11, wherein each column of sub-pixels in the pixel array comprises multiple groups of sub-pixels, each group of sub-pixels comprises a first color sub-pixel, a second color sub-pixel and a third color sub-pixels which are arranged in sequence, the sub-pixels in a same row are same in color, and the first color sub-pixel, the second color sub-pixel and the third color sub-pixel have at least one red sub-pixel, at least one green sub-pixel and at least one blue sub-pixel.

13. A liquid crystal display device, a comprising a display panel having a display component and a backlight module having a backlight component divided into a plurality of backlight sub-areas, wherein the liquid crystal display device further comprises a memory storing a computer executable instruction, and a driving device, wherein the driving device executes the computer executable instruction that performs a method comprising:
  displaying each picture with two frame images in sequence; the display component and the drive component are integrated on the display panel; the two frame images comprise a first frame image and a second frame image; drive voltages of adjacent two sub-pixels on each frame image comprise a high drive voltage and a low drive voltage, and the drive voltages of each sub-pixel in the first frame image and in the second frame image comprise a high drive voltage and a low drive voltage;
  acquiring position information of a current sub-pixel and drive data for driving the current sub-pixel;
  looking up a judging parameter corresponding to the position information in a first parameter lookup table according to the position information;
  directly outputting the drive data if the judging parameter is a first parameter; and
  looking up and outputting compensation drive data in a second parameter lookup table according to the position information and the drive data if the judging parameter is a second parameter, wherein the second parameter lookup table corresponds to the position information, and the compensation drive data corresponds to the drive data;
wherein the backlight module further comprises:
a first backlight controller, connected to the driving device and configured for determining backlight brightness adjusting signals of each backlight sub-area according to the drive voltages of a first frame image area and a second frame image area corresponding to each backlight sub-area, wherein the backlight brightness adjusting signals are in groups and a group number is same as a variety number of color sub-pixels;
a second backlight controller, connected to the first backlight controller and the backlight component respectively, and configured for performing independent brightness adjustment on a backlight source of the sub-pixels of various colors in corresponding backlight sub-areas in respective frame images of a next picture;
wherein the backlight component, the first backlight controller and the second backlight controller are integrated on the backlight module.

14. The liquid crystal display device according to claim 13, further comprising a storage memory, wherein the storage memory is electrically connected to the display panel and the backlight module and is configured to for storing a lookup table; the lookup table is a corresponding relation table of the drive voltage of each sub-pixel in the first frame image and the second frame image corresponding to an input signal and the input signal; and the acquires the drive voltage of each sub-pixel on the first frame image and the second frame image by the lookup table.

15. The liquid crystal display device according to claim 14, wherein the first backlight controller comprises:
  a counter configured for counting average drive voltages of the sub-pixels of various colors in the first frame image area and the second frame image area corresponding to each backlight sub-area; and
  a calculator configured for solving the backlight brightness adjustment signals according to the average drive voltages, reference backlight brightness signals and reference drive voltages of respective backlight sub-areas;

wherein a calculating formula for the calculator to solve the backlight brightness adjustment signal of the sub-pixels of each color in each backlight sub-area is as follows:

$$A_{M\_P1} * P_{M\_ave1} = A_{M\_P2} * P_{M\_ave2};$$

$$2 * A_{M\_P} * P_{M\_ave} = A_{M\_P1} * P_{M\_ave1} + A_{M\_P2} * P_{M\_ave2};$$

wherein P represents a target color sub-pixel; M represents a serial number of the backlight sub-area; $A_{M\_P1}$ represents the backlight brightness adjustment signal for performing backlight brightness adjustment on a backlight source of P sub-pixels in the backlight sub-area M corresponding to the first frame image of the next picture; $A_{M\_P2}$ represents the backlight brightness adjustment signal for performing backlight brightness adjustment on a backlight source of the P sub-pixels in the backlight sub-area M corresponding to the second frame image of the next picture; $P_{M\_ave1}$ represents an average value of the drive voltages of the P sub-pixels in the backlight sub-area M corresponding to the first frame image of the current picture; $P_{M\_ave2}$ represents an average value of the drive voltages of the P sub-pixels in the backlight sub-area M corresponding to the second frame image of the current picture; $A_{M\_P}$ represents the reference backlight brightness signal of the P sub-pixels in the backlight sub-area M corresponding to the image of the current picture; and $P_{M\_ave}$ represents the average value of reference drive voltages of the P sub-pixels in the frame image area corresponding to the backlight sub-area M on the image of the current picture.

16. The liquid crystal display device according to claim 13, wherein the backlight source is a white light backlight source, an RGB backlight source, an RGBW backlight source or RGBY backlight source.

17. The liquid crystal display device according to claim 13, wherein the driving device further comprises a timing controller.

18. The liquid crystal display device according to claim 13, wherein the second parameter lookup table of the driving device comprises a first compensation parameter lookup table, a second compensation parameter lookup table and a third compensation parameter lookup table;
  the step of looking up and outputting compensation drive data in a second parameter lookup table according to the position information and the drive data if the judging parameter is a second parameter comprises:
  looking up and outputting the compensation drive data in the first compensation parameter lookup table if the sub-pixels corresponding to the position information are first color sub-pixels;
  looking up and outputting the compensation drive data in the second compensation parameter lookup table if the sub-pixels corresponding to the position information are second color sub-pixels; and
  looking up and outputting the compensation drive data in the third compensation parameter lookup table if the sub-pixels corresponding to the position information are third color sub-pixels.

19. The liquid crystal display device according to claim 13, wherein the display panel comprises at least one sub-pixel unit, the sub-pixel unit comprises m column×n row sub-pixels, the at least one sub-pixel unit is regularly arranged to form a pixel array comprising m column×n row sub-pixels, the first parameter lookup table is formed by m column×n row judging parameters, and the sub-pixels in the sub-pixel unit correspond to the judging parameters in the first parameter lookup table one to one according to an arrangement position;

wherein $M \geq m \geq 1$, $N \geq n \geq 1$, and M, N, m and n are positive integers.

20. The liquid crystal display device according to claim 19, wherein the each column of sub-pixels in the pixel array comprises multiple groups of sub-pixels, each group of sub-pixels comprises a first color sub-pixel, a second color sub-pixel and a third color sub-pixels which are arranged in sequence, the sub-pixels in a same row are same in color, and the first color sub-pixel, the second color sub-pixel and the third color sub-pixel have at least one red sub-pixel, at least one green sub-pixel and at least one blue sub-pixel.

* * * * *